No. 620,511. Patented Feb. 28, 1899.
M. SPIER.
MANUFACTURE OF IGNITERS FOR GAS BURNERS.
(Application filed Feb. 12, 1898.)

(No Model.)

WITNESSES:
Geo. W. Jaekel
O. F. Gast

INVENTOR
Max Spier
BY
Jacques Kaegener
ATTORNEYS.

UNITED STATES PATENT OFFICE.

MAX SPIER, OF NEW YORK, N. Y., ASSIGNOR TO EMANUEL S. ULLMANN, TRUSTEE, OF SAME PLACE.

MANUFACTURE OF IGNITERS FOR GAS-BURNERS.

SPECIFICATION forming part of Letters Patent No. 620,511, dated February 28, 1899.

Application filed February 12, 1898. Serial No. 670,081. (No specimens.)

*To all whom it may concern:*

Be it known that I, MAX SPIER, a citizen of the United States, residing at New York, in the borough of Manhattan and State of New York, have invented certain new and useful Improvements in the Manufacture of Igniters for Gas-Burners, of which the following is a specification.

This invention relates to the improved manufacture of igniters for gas-burners which have the property of being heated by contact with illuminating-gas, so that a platinum wire forming part of the same is heated to incandescence and thereby the gas escaping through the burner lighted without the use of any explosive, electric, or other igniting devices.

My invention consists of the process of making igniters for gas-burners by treating a piece of porous material with a solution of platinum and palladium nitrate, then with a solution of ammonium chlorid, after which the saturated porous bodies are subjected to the vapors of sulfuric acid mixed with hydrogen, and finally heated to white heat in atmospheric air.

Figure 1:
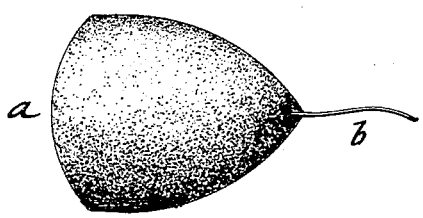
Figure 2:
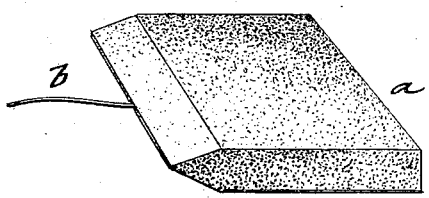
Figure 3:
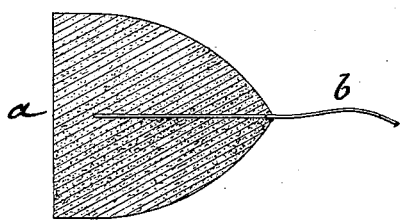
Figure 4:

In the accompanying drawings, Figures 1 and 2 are perspective views of different forms of my improved igniters for gas-burners, and Figs. 3 and 4 are vertical longitudinal sections of the same.

Similar letters of reference indicate corresponding parts.

In carrying out my invention the porous bodies $a$, which are made of meerschaum, charcoal, compacted asbestos fibers, coke, talcum, or any other suitable porous material, are saturated with a solution of platinum nitrate and palladium nitrate in water, preferably in the proportion of one ounce of platinum nitrate and fifteen grains of palladium nitrate in about ten ounces of water. The saturated porous bodies are then slowly dried and submerged in a ten-per-cent. solution of ammonium chlorid. They are then placed in a closed receptacle, which is heated to about 200° centigrade and through which a mixture of sulfuric-acid vapors and pure hydrogen are passed, the saturated bodies being subjected to the heat and the action of the vapors for about three-quarters of an hour. They are then removed from the receptacle and heated to white heat by a Bunsen burner, so that metallic platinum and palladium in a finely-divided state is deposited in the porous bodies, which then have the property of being heated to red heat under the influence of and by contact with hydrocarbon-gases, such as illuminating-gas. The porous bodies $a$ may be made either in conical shape, rounded off at one end, or in square flat shape, as shown, respectively, in Figs. 1 and 2. A platinum or palladium wire $b$ is inserted or otherwise attached to each body $a$. The wire $b$ is heated to incandescence when the metallic deposit in the porous body is heated to red heat by contact with illuminating or other hydrocarbon gas. When the igniter is placed in close proximity to the tip of a gas-burner, the gas, impinging thereon, will first heat the porous body to red heat and the latter the platinum or palladium wire to incandescence, so that the gas is ignited, so that a very reliable means is furnished for igniting gas-burners without the use of explosive, electric, or other appliances heretofore in use.

The igniter is preferably arranged near the gas-burner and is adapted to be placed over the burner-tip when the burner is to be lighted.

The igniter may be mounted on the gas-fixture itself, or it may be a separate device. In the latter form one igniter may be used for lighting a number of burners, whereas if attached to the fixture a separate igniter would be required for each bracket or chandelier.

By the contact with the escaping gas the porous body is heated and the platinum or palladium wire rendered incandescent, so as to instantly light the gas. This takes place within from two to five seconds. The igniter is then moved away from the tip of the gas-burner, so as not to be affected by the heat of the flame.

The igniter retains the property of igniting under the influence of the illuminating-gas for a long time and may be replaced, if necessary, when it has lost its property of ignition.

As the igniters can be furnished at a small expense, a very convenient and effective means for lighting gas-burners is thus supplied.

Having thus described my invention, what I claim as new, and desire to secure by Letters Patent, is—

1. The process herein described of preparing igniters for gas-burners, which consists in the following steps: first, saturating suitable porous bodies with a solution of platinum and palladium nitrate; second, drying the same; third, saturating them with ammonium chlorid; fourth, heating them in an atmosphere of sulfuric-acid vapors and hydrogen, and finally heating them to white heat in atmospheric air, substantially as set forth.

2. The process herein described of preparing igniters for gas-burners, which consists in saturating suitable porous bodies with platinum and palladium nitrate, depositing under the influence of heat and sulfuric-acid vapors and hydrogen metallic platinum and palladium in finely-divided state in said bodies and lastly heating said bodies to white heat in atmospheric air, substantially as set forth.

In testimony that I claim the foregoing as my invention I have signed my name in presence of two subscribing witnesses.

MAX SPIER.

Witnesses:
PAUL GOEPEL,
GEO. W. JAEKEL.